No. 632,560. Patented Sept. 5, 1899.
Z. T. FURBISH.
CHUCK.
(Application filed June 14, 1898.)
(No Model.)
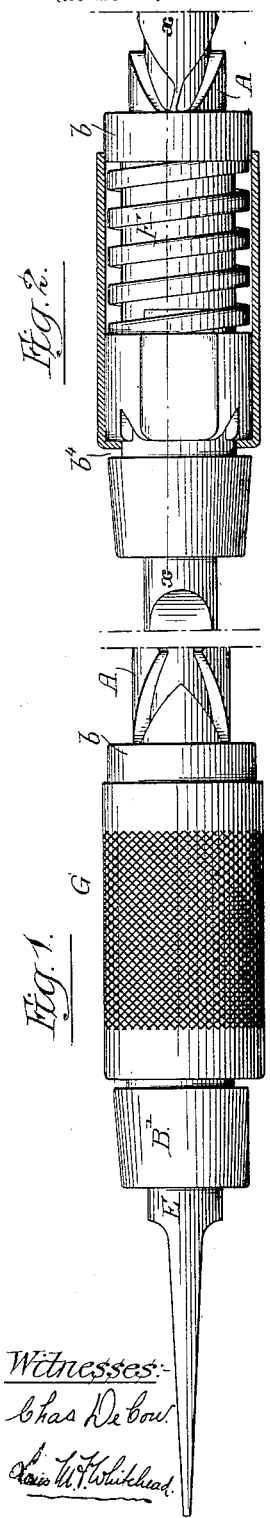
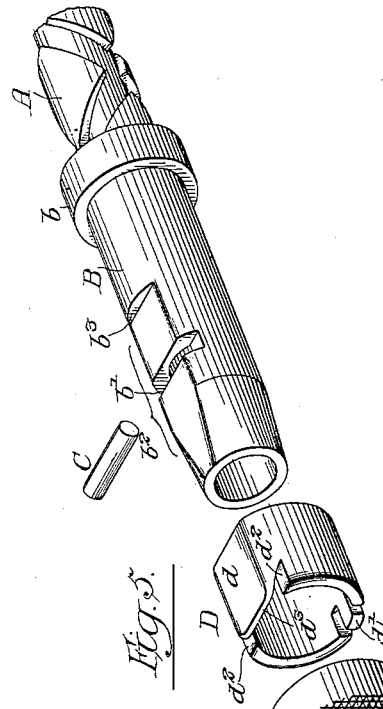
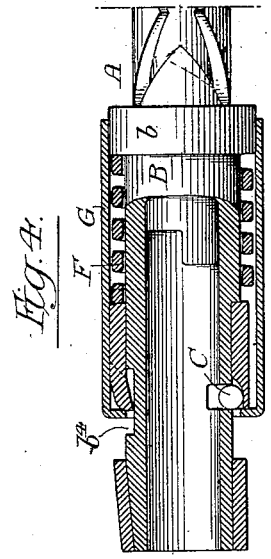
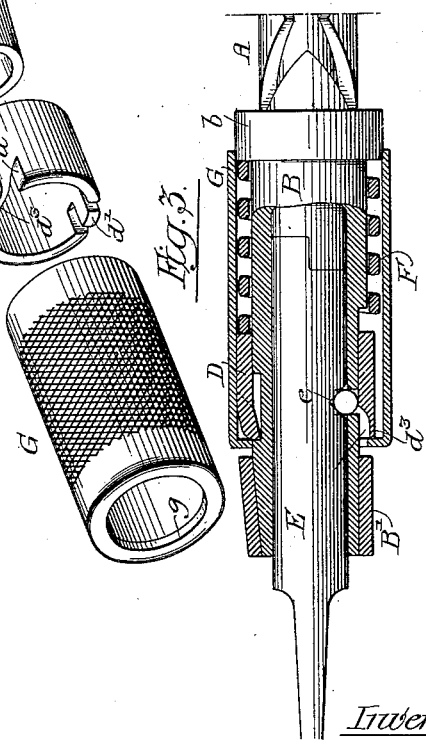
Witnesses:
Chas De Bow
Lois W. T. Whitehead
Inventor:
Zachry T. Furbish,
by his Attorneys
Howson & Howson
THE NORRIS PETERS CO., PHOTO-LITHO., WASHINGTON, D. C.

UNITED STATES PATENT OFFICE.

ZACHRY T. FURBISH, OF PHILADELPHIA, PENNSYLVANIA, ASSIGNOR TO THE NORTH BROTHERS MANUFACTURING COMPANY, OF SAME PLACE.

CHUCK.

SPECIFICATION forming part of Letters Patent No. 632,560, dated September 5, 1899.

Application filed June 14, 1898. Serial No. 683,437. (No model.)

*To all whom it may concern:*

Be it known that I, ZACHRY T. FURBISH, a citizen of the United States, residing in Philadelphia, Pennsylvania, have invented certain Improvements in Chucks, of which the following is a specification.

The object of my invention is to construct a simple and effective chuck for securing bits to tool-stocks.

My invention relates particularly to chucks for ratchet screw-drivers or drills; but it will be understood that it can be used for any purpose for which a chuck is intended.

In the accompanying drawings, Figure 1 is a side view of my improved chuck. Fig. 2 is a plan view with the outside casing in section. Fig. 3 is a section on the line $xx$, Fig. 2, showing the bits secured in the chuck. Fig. 4 is a view of the chuck with the bit removed, and Fig. 5 is a detached perspective view.

A in the present instance is a portion of the spindle forming part of a ratchet screw driver or drill. On the end of this spindle is secured a hollow hub B, having a head $b$ at the inner end. The hub B has a transverse slot $b'$, in which works a roller C. The surface of the hub is flattened at $b^2$, so as to form a shoulder $b^3$. Adapted to slip over this hub is a sleeve D, having a flattened portion $d$, adapted to the flattened portion of the hub. The sleeve has a lug $d'$, formed by making two slots in the sleeve. This lug after the sleeve is slipped upon the hub is bent down into the slot $b^4$ in the hub, as shown in Fig. 3, and prevents the withdrawal of the sleeve and limits the longitudinal motion in one direction on the hub, the longitudinal motion in the other direction being limited by the shoulder $b^3$. It will thus be seen that the sleeve has a limited longitudinal motion, but cannot turn on the hub. The sleeve D is cut away so as to form a tapered lip $d^3$ and shoulders $d^2$ to keep the roller in position. The sleeve is so proportioned that when the hub is moved forward the sleeve will project the roller C into the slot $b'$, and if a bit is within the socket it will be locked to the clutch by the roller, as shown in Fig. 3; but if the sleeve is moved back the lip will be in line with the roller and the roller will move into the cavity under the lip and the bit will be released, as shown in Fig. 4. The roller is of such a length that it will snugly fit between the shoulders $d^2$ of the sleeve D, so that it is free to move into and out of the slot $b'$, but cannot move longitudinally.

The bit E in the present instance is in the form of a screw-driver having a shouldered extremity adapted to fit against the shouldered end of the drill-stock A, and in the bit is a groove $e$, into which the roller C is forced by the sleeve D. In order to lock the roller within the groove, I mount a coil-spring F between the shoulder $b$ of the hub and the sleeve D. This spring tends to force the sleeve forward and keep the roller always within the groove.

Inclosing the sleeve D and the spring F is a casing G, having an internal flange $g$ at its outer end, which is in front of the sleeve D, and by drawing this casing backward it will force the sleeve D back against the pressure of the spring, and consequently will release the bit E, which can then be removed. The collar B' is forced onto the end of the hub and prevents the removal of the casing G.

It will thus be seen that I can make a very cheap and effective chuck for holding a screw-driver or drill-bit, and a chuck of this character is especially useful for ratchet screw-drivers or drills.

I claim as my invention—

1. The combination of a hub having a transverse slot, a roller located in the slot, a sliding sleeve on the hub and undercut to form a cavity for the roller when the sleeve is in one position, substantially as described.

2. The combination of a hub having a transverse slot, a roller located in the slot, a movable sleeve on the hub and undercut to form a cavity for the roller when the sleeve is in one position, said sleeve having shoulders at each side of the cavity for the roller, substantially as set forth.

3. The combination of a hub, having a transverse slot, a roller located in said slot, and to extend within the hub, a sleeve having a tapered lip forming a cavity into which the roller can pass, a spring for forcing the sleeve forward, and a casing inclosing the sleeve and spring, substantially as described.

4. The combination of a slotted hub, a roller within the slot, an undercut sleeve mounted on the hub, said hub being recessed, a lug on the sleeve adapted to the recess, and means for moving the sleeve forward, substantially as described.

5. The combination in a chuck, of a hub slotted transversely, a roller located in the slot, a sleeve mounted on the hub and adapted to slide thereon, and having a beveled portion to control the roller, said sleeve having side bearing-cheeks to confine the roller laterally, substantially as described.

In testimony whereof I have signed my name to this specification in the presence of two subscribing witnesses.

ZACHRY T. FURBISH.

Witnesses:
  WILL. A. BARR,
  JOS. H. KLEIN.